(12) United States Patent
Fleury

(10) Patent No.: US 12,135,527 B2
(45) Date of Patent: Nov. 5, 2024

(54) TIMEPIECE COMBINING DISPLAY HANDS AND A DIGITAL DISPLAY SCREEN

(71) Applicant: ETA SA Manufacture Horlogère Suisse, Grenchen (CH)

(72) Inventor: Emmanuel Fleury, Moutier (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 303 days.

(21) Appl. No.: 17/658,742

(22) Filed: Apr. 11, 2022

(65) Prior Publication Data
US 2022/0413444 A1 Dec. 29, 2022

(30) Foreign Application Priority Data
Jun. 25, 2021 (EP) .................................. 21181673

(51) Int. Cl.
*G04G 9/00* (2006.01)
*G04B 19/04* (2006.01)
*G06F 3/14* (2006.01)

(52) U.S. Cl.
CPC ........... *G04G 9/0064* (2013.01); *G04B 19/04* (2013.01); *G06F 3/14* (2013.01)

(58) Field of Classification Search
CPC ................................ G04G 9/0064; G04B 19/04
See application file for complete search history.

(56) References Cited

U.S. PATENT DOCUMENTS

| 6,661,743 | B1 | 12/2003 | Mafune et al. |
| 9,348,320 | B1* | 5/2016 | Defazio .............. G04G 9/0064 |
| 10,274,904 | B2* | 4/2019 | Minami .................. G06F 3/147 |
| 11,009,833 | B2* | 5/2021 | Essery ...................... G04G 9/06 |
| 11,144,014 | B2* | 10/2021 | Olwal .................. G04B 47/063 |
| 2013/0051189 | A1 | 2/2013 | Springer |
| 2014/0293755 | A1* | 10/2014 | Geiser .................. G04G 9/0082 368/10 |
| 2015/0131412 | A1 | 5/2015 | Springer |
| 2016/0306328 | A1* | 10/2016 | Ko .......................... G04C 17/00 |

(Continued)

FOREIGN PATENT DOCUMENTS

JP 2013-44753 A 3/2013

OTHER PUBLICATIONS

European Search Report issued Nov. 23, 2021 in European Application 21181673.1, filed on Jun. 25, 2021 (with English Translation of Categories of cited documents), citing documents AA-AD & AO therein, 3 pages.

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A timepiece including a case; pivotably mounted display hands; a movement to drive the display hands while defining a sweeping surface; a display screen, a first part of the sweeping surface being superimposed on the screen and a second part of the sweeping surface not being superimposed on the screen; a control circuit configured to sequentially switch between first and second operating modes, with: a first operating mode wherein the display hands are driven in the first and second parts of the sweeping surface; a second operating mode wherein the display hands are driven only in the second part of the sweeping surface with display of a piece of information by the display screen.

9 Claims, 9 Drawing Sheets

(56) References Cited

U.S. PATENT DOCUMENTS

| | | | |
|---|---|---|---|
| 2016/0327915 A1* | 11/2016 | Katzer | G04C 3/002 |
| 2017/0003710 A1* | 1/2017 | MacWilliams | G06F 1/163 |
| 2017/0261934 A1 | 9/2017 | Matsuzawa et al. | |
| 2017/0300016 A1* | 10/2017 | Lider | G04G 9/0082 |
| 2018/0004166 A1* | 1/2018 | Lider | G04B 19/00 |
| 2018/0196397 A1* | 7/2018 | Clivaz | G04G 21/04 |
| 2019/0064746 A1* | 2/2019 | Lider | G04B 19/04 |
| 2020/0249632 A1* | 8/2020 | Olwal | G06F 1/163 |

* cited by examiner

TIMEPIECE COMBINING DISPLAY HANDS AND A DIGITAL DISPLAY SCREEN

CROSS-REFERENCE TO RELATED APPLICATION

This application claims priority to European Patent Application No. 21181673.1 filed on Jun. 25, 2021, the entire disclosure of which is hereby incorporated herein by reference.

TECHNICAL FIELD OF THE INVENTION

The invention relates to the timepieces combining an analogue display with hands and a digital display.

TECHNOLOGICAL BACKGROUND

For several years now, watches have integrated in combination an analogue display based on hands and a digital display, typically based on a liquid-crystal display. The hands are typically used to indicate the time to the user by their position with respect to the dial of the watch. Such a configuration allows both to preserve the clarity and the traditional side of an analogue display and the richness of the information that can be displayed with a liquid-crystal display.

However, one of the major disadvantages of such a combination is to provide a configuration for display of information that is not adapted to a daily and frequent reading of the latter by the wearer of the watch, with the risk of rapidly causing in them visual fatigue or even vision problems.

SUMMARY OF THE INVENTION

For this purpose, the invention relates to a timepiece, comprising:
- a case in which a housing volume is made;
- display hands pivotably mounted in the housing volume;
- a movement, configured to drive the display hands in rotation, one complete rotation of the display hands defining a sweeping surface;
- a display screen positioned in the housing volume below the level of the display hands, a first part of the sweeping surface being superimposed on said display screen and a second part of the sweeping surface not being superimposed on said display screen;
- a control circuit configured to sequentially switch between first and second operating modes, with:
  - a first operating mode in which the control circuit controls the driving of the display hands in the first and second parts of the sweeping surface in order to display a piece of chronometric information;
  - a second operating mode in which the control circuit controls the driving of the display hands only in the second part of the sweeping surface in order to display a piece of chronometric information and in which the control circuit controls the display of a piece of information by the display screen.

In other embodiments:
- the piece comprises a switch capable of being used from outside the case and associated with the control circuit so as to trigger a switching between the first and second operating modes;
- the control circuit is configured to automatically switch from the first to the second display mode as soon as it controls a display on said display screen;
- the first and second parts of the sweeping surface are half-discs;
- the control circuit superimposes the display hands and drives them in rotation so as to display a piece of chronometric information in said second operating mode;
- the piece of chronometric information displayed is of the hour, countdown or chronograph type;
- the piece further comprises a dial separating the display hands from the control circuit, the dial being provided with an index for displaying time;
- the dial includes a first series of indexes and a second series of indexes corresponding to respective chronometric information for the first and second operating modes;
- the screen includes a peripheral part surrounding the sweeping surface, the control circuit being configured to display different indexes on the peripheral part according to the first or the second operating mode.

BRIEF DESCRIPTION OF THE DRAWINGS

The goals, advantages and features of the invention will be clearer upon reading the following description, in reference to the drawings in which.

DETAILED DESCRIPTION OF THE INVENTION

In the rest of the description, the terms "top", "bottom", "upper", "lower", "above", "below" are to be considered while taking into account a horizontal median plane parallel to the horizontal bearing plane of the case of the watch on a surface.

The terms "outside", "outer", "inside" and "inner" are to be understood while taking into account a median axis oriented perpendicularly to a median plane. The median plane is generally defined by a dial of the watch, the median axis generally being defined by the axis of rotation of the display hands of the watch.

Figure 1:
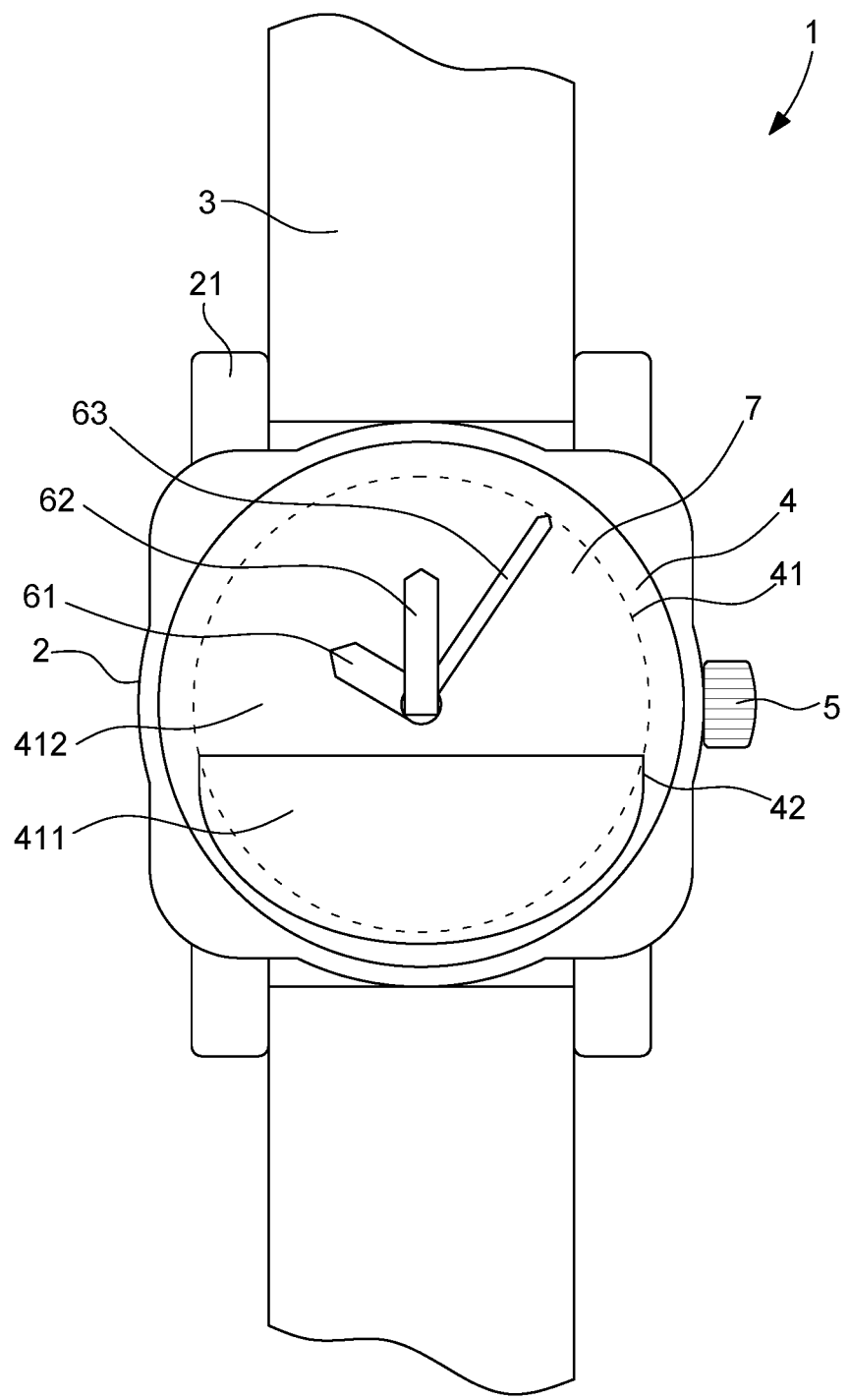
FIG. 1 is a top view of an example of a watch for which the invention is implemented.

FIG. 1 shows a diagram of a watch 1 in a top view, for which the invention is capable of being implemented. The watch 1 includes a case 2 provided with a middle. The watch 1 includes here a wristlet 3 fastened to the case 2. For this purpose, the watch 1 includes on either side of its middle two horns 21 each arranged to fasten a distinct strand of the wristlet 3. The watch 1 includes here a control element 5 which can be used as a switch as will be shown below. Such a control element 5 can also be called "switching element" and can preferably comprise a single mobile element, and for example be formed by any component adapted for this purpose, such as a rotating bezel, a push button, a touch surface of the case or of the glass, etc. Also preferably, this control element 5 corresponds to a crown, for example with a push-piece, forming a crown for setting time.

The case 2 of the watch 1 includes a housing volume 4 defined by the middle (generally made from a metal material) and defined between a dial 7 and a transparent glass (not labelled). The housing volume 4 of the watch 1 is thus closed by the top of the glass (for example made of sapphire glass). The glass can be supported in a manner known per se by the middle and fastened in a sealed manner to the latter by an adapted method. The dial 7 can advantageously include numerical or graphic indexes 71, not shown in FIG. 1 in order to clarify the illustration.

The watch 1 further includes display hands 61 to 63 housed in the housing volume 4. The hands 61 to 63 are driven in rotation by a horological movement not shown, with a view in particular to displaying the time. The horological movement is separated here from the hands 61 to 63 by the dial 7. A hand 61 intended to indicate the hour, a hand 62 intended to indicate the minutes, and a hand 63 intended to indicate the seconds can be distinguished here. A different number of display hands can of course be provided. The hands 61 to 63 are mounted here in rotation about the same median axis. This dial 7 comprises a surface 41 corresponding to a surface swept by the hands 61 and 63 over one rotation. Since the hand 63 is the longest, the swept surface 41 is defined here by the length of this hand 63. In other words, the end of this hand 63 defines the contour/the delimitation of this surface 41 on the dial 7.

The dial 7 includes a digital display screen 42, here in its lower part. The display screen 42 is thus present in the housing volume 4 and positioned below the level of the hands 61 to 63. The sweeping surface 41 can be divided into a first part 411 which is superimposed on the display screen 42 and a second part 412 which is not superimposed on the display screen 42. The superposition of the sweeping surface 41 with the screen 42 is determined by its projection according to the axis of rotation of the hands 61 to 63. The first and second parts 411 and 412 do not have an equal size here. It is noted in an alternative of the invention, these first and second parts 411 and 412 could have a substantially equal or an equal size.

The watch 1 includes a control circuit. The control circuit is advantageously housed in the case 2, typically under the dial 7. According to the invention, the control circuit is configured to have first and second operating modes and to switch sequentially between them.

Figure 2:
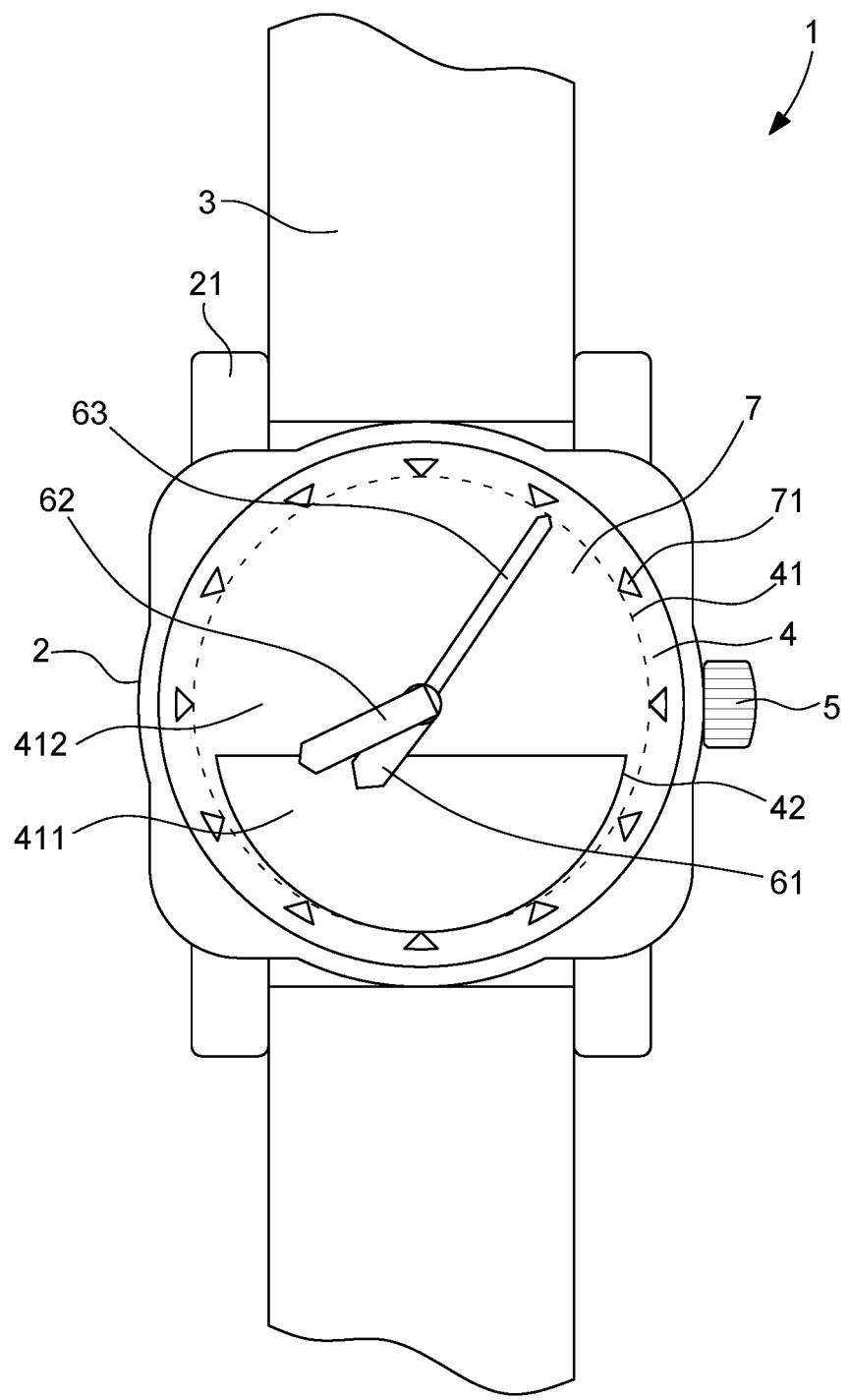
FIG. 2 is a top view of the watch of FIG. 1 in a first display mode.

FIG. 2 illustrates the watch 1 of FIG. 1 in the first operating mode of the control circuit. In this first operating mode, the control circuit controls the horological movement to drive the display hands 61, 62, 63 in the first and second parts 411 and 412 of the sweeping surface 41 in order to display a piece of chronometric information. Thus, in the configuration illustrated, the hands 61 and 62 are in the first part 411 and are thus superimposed on the display screen 42. The hand 63 is in the part 412. The indexes 71 of the dial 7 favour the identification of the chronometric indication by the hands 61 to 63. The chronometric indication here is the indication of time in a manner known per se. The chronometric indication can also be of the countdown or chronograph type in a manner known per se. In the example illustrated here, the control circuit does not control the display of any information on the display screen 42. In this first operating mode, the display of a piece of chronometric information by the hands 61 to 63 uses the entire sweeping surface 41 and thus optimises the analogue display for maximum visibility for the user.

Figure 3:
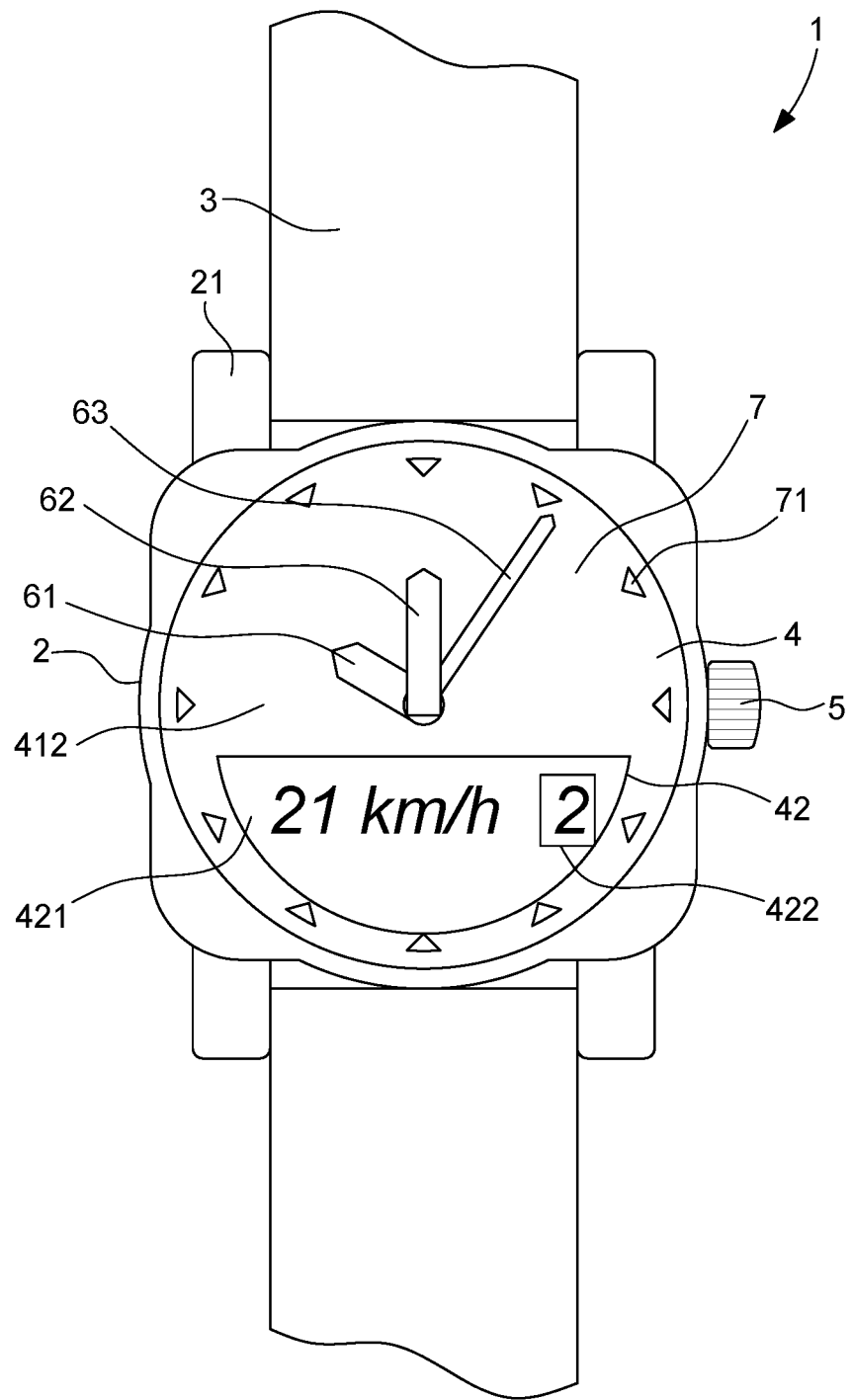
FIG. 3 is a top view of the watch of FIG. 1 in a second display mode.

FIG. 3 illustrates the watch of FIG. 1 in an example of a second operating mode of the control circuit. In this second operating mode, the control circuit controls the display of a piece of information by the display screen 42. The piece of information displayed by the screen 42 can be of any type: for example a piece of information coming from the outside in the case of a smart watch, a piece of chronological information, or a piece of information on instantaneous speed, distance covered or position for a watch having geolocation functionalities. The watch 1 can comprise a wireless communication circuit, in order to be able to connect said watch with the outside and thus have available information coming from the outside with a view to displaying it on the screen 42.

In the example illustrated in FIG. 3, the screen 42 includes a main display zone 421 and a secondary display zone 422. In this example, the screen 42 displays a piece of information on speed in its main zone 421 and indicates in the secondary display zone 422 the category of the piece of information displayed in the main zone. The secondary display zone 422 can also indicate the nature of the piece of chronometric information displayed by the hands 61 to 63 (indication of time, countdown, chronograph . . . ).

Figure 4:
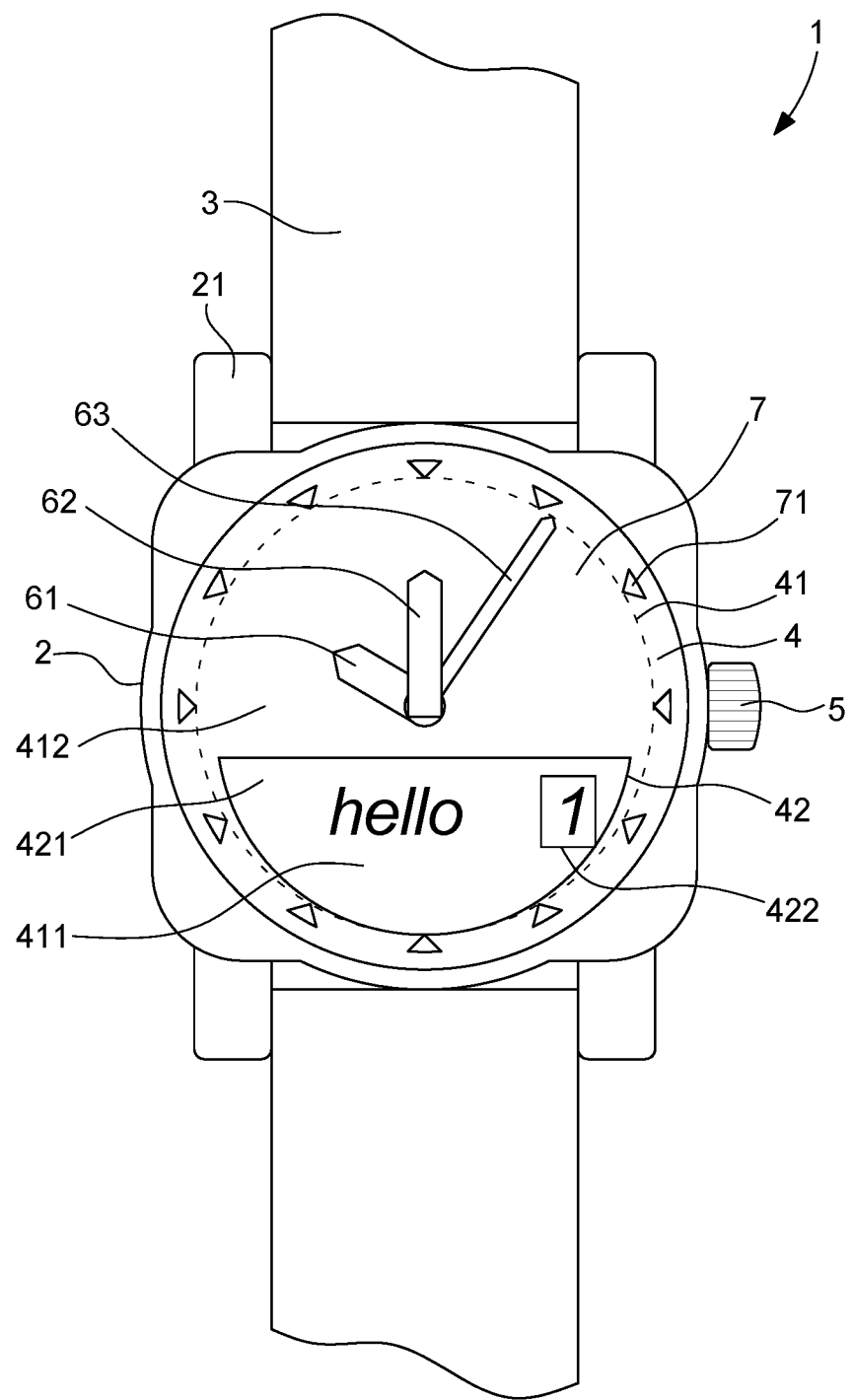
FIG. 4 is a top view of the watch of FIG. 1 in an alternative of the second display mode.

In the example illustrated in FIG. 4, the main display zone 421 displays a message and the secondary display zone 422 specifies the category of information displayed in the main display zone 421.

As mentioned above, the control element 5 can be used as a switch to sequentially display various categories of information in the main display zone 421 of the screen 42. The switching between the two operating modes can also be based on the detection of movements of the wrist of the user, for example if the watch 1 includes sensors of the gyroscope/accelerometer type.

In this second operating mode, the horological movement is configured to drive the display hands 61, 62, 63 only in the second part 412 of the sweeping surface 41 in order to display a piece of chronometric information. Thus, the hands 61 to 63 can still be used to display a piece of chronometric information, without altering the vision of the display screen 42 since the hands 61 to 63 are not disposed in the first part 411. In this example, the piece of chronometric information can be an indication of time, a countdown or a chronograph. A scale of 12 hours is defined here by the upper part of the dial 7. The index farthest to the right, located here in FIG. 4 near the crown 5, corresponds to a zero value. Such an index corresponds if necessary to 12 hours, 60 minutes or 60 seconds according to the display hand 61 to 63 considered. Thus, only the upper indexes of the dial 7 define the display of time here. In the example illustrated in FIG. 4, the hands 61 to 63 indicate that it is two hours, zero minutes and 41 seconds (or that this time remains for a countdown mode, or that this time has passed for a chronograph mode).

The control element 5 can be used as a switch to switch between the first and second display modes. It is also possible for the switching between the first and second display modes to be controlled by a communication with the outside, for example in the case of a smart watch. The switching to the second operating mode can for example occur upon reception of a new message for a smart watch. It is also possible for the control circuit to switch to the second operating mode as soon as it displays a piece of information on the display screen 42. It is also possible for a switching between the first and second operating modes to occur after a delay, for example after the user has ordered an initial switch (for example by requesting the first operating mode to precisely view the time) via the button 5.

Figure 5:
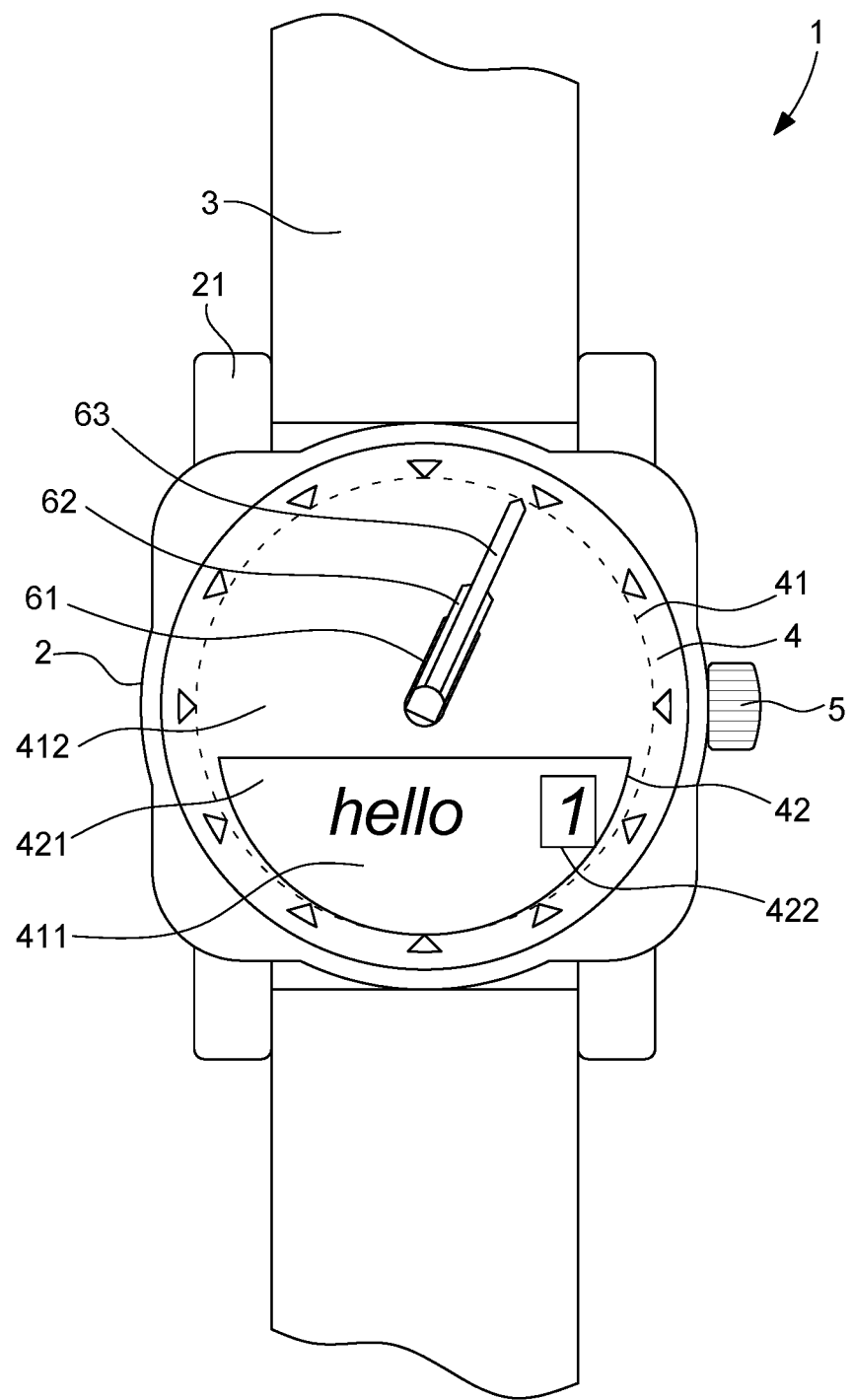
FIG. 5 is a top view of the watch of FIG. 1 in another alternative of the second display mode.

FIG. 5 illustrates the watch 1 of FIG. 1 in another example of the second operating mode of the control circuit. The control circuit also controls the horological movement to drive the display hands 61, 62, 63 only in the second part 412 of the sweeping surface 41 in order to display a piece of chronometric information. Thus, the hands 61 to 63 can still be used to display a piece of chronometric information, without altering the vision of the display screen 42 since the hands 61 to 63 are not disposed in the first part 411. The hands 61 to 63 are superimposed here, in order to favour rapid reading of the piece of chronometric information limited to the part 412. In this display mode, the control circuit thus drives the hands 61 to 63 in superposition. In the example illustrated in FIG. 5, the piece of chronometric information displayed by the hands 61 to 63 is six hours, thirty-six minutes and thirty-six seconds.

Figure 6:
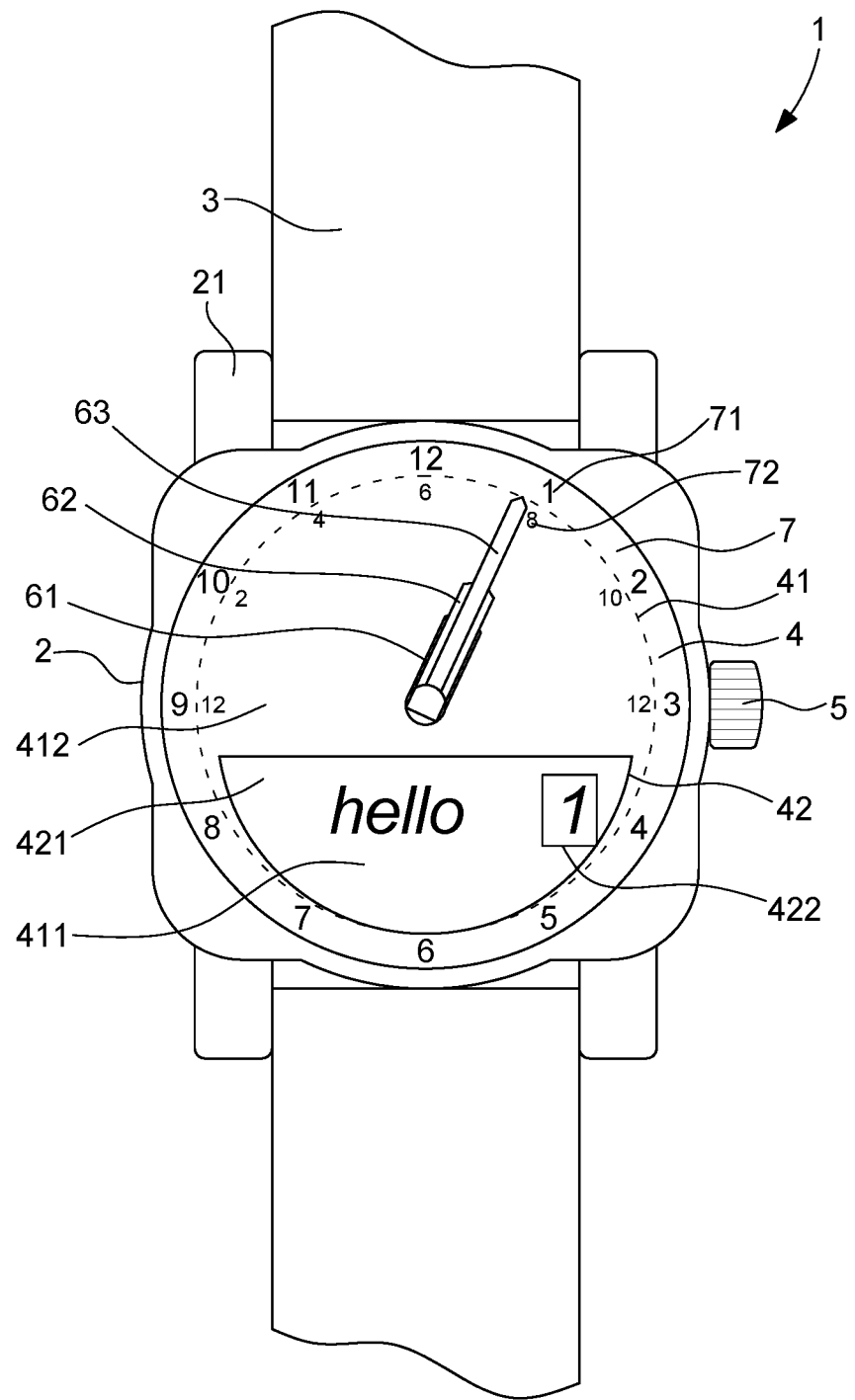
FIG. 6 is a top view of an alternative of the watch of FIG. 5 in an alternative of the second display mode.

FIG. 6 illustrates an alternative of the watch 1 of FIG. 1 in the example of a second operating mode of the control circuit corresponding to FIG. 5. The control circuit also controls the horological movement to drive the display hands 61, 62, 63 only in the second part 412 of the sweeping surface 41 in order to display a piece of chronometric information. Thus, the hands 61 to 63 can still be used to display a piece of chronometric information, without altering the vision of the display screen 42 since the hands 61 to 63 are not disposed in the first part 411. The hands 61 to 63 are superimposed here, in order to favour rapid reading of the piece of chronometric information limited to the part 412. In this display mode, the control circuit also drives the hands 61 to 63 in superposition. In order to facilitate the reading of the time in this second operating mode, the dial 7 includes a first series of indexes 71 for the reading of a piece of chronometric information in the first operating mode, and a second series of indexes 72 for the reading of a piece of chronometric information in the second operating mode.

In order to allow the hands 61 to 63 to come back to their initial position after having reached the end of the second display part 412 in the second operating mode (for example when a hand reaches the index 71 identified by "3" in FIG. 6), the watch 1 includes a retrograde display. This retrograde display allows to avoid the hands 61 to 63 being superimposed on the first display part 411 during the second operating mode. In other words, the control circuit can control a rapid rotation of the hands 61 to 63 until the beginning of the second display part 412 (for example until the index 71 identified by "9" in FIG. 6), in the retrograde direction, with the goal of avoiding the superposition of this first part 411 by the hands 61 to 63. Such a retrograde display can be implemented via a movement including one or more bidirectional motors. According to another alternative, when the hands 61 to 63 reach the end of the second display part 412 in the second operating mode, the control circuit can control a rapid rotation of the hands 61 to 63 in the clockwise direction until the beginning of the second display part 412 (for example until the index 71 identified by "9" in FIG. 6). Thus, the hands 61 to 63 are only furtively superimposed on the first part 411 in this second operating mode.

Figure 7:
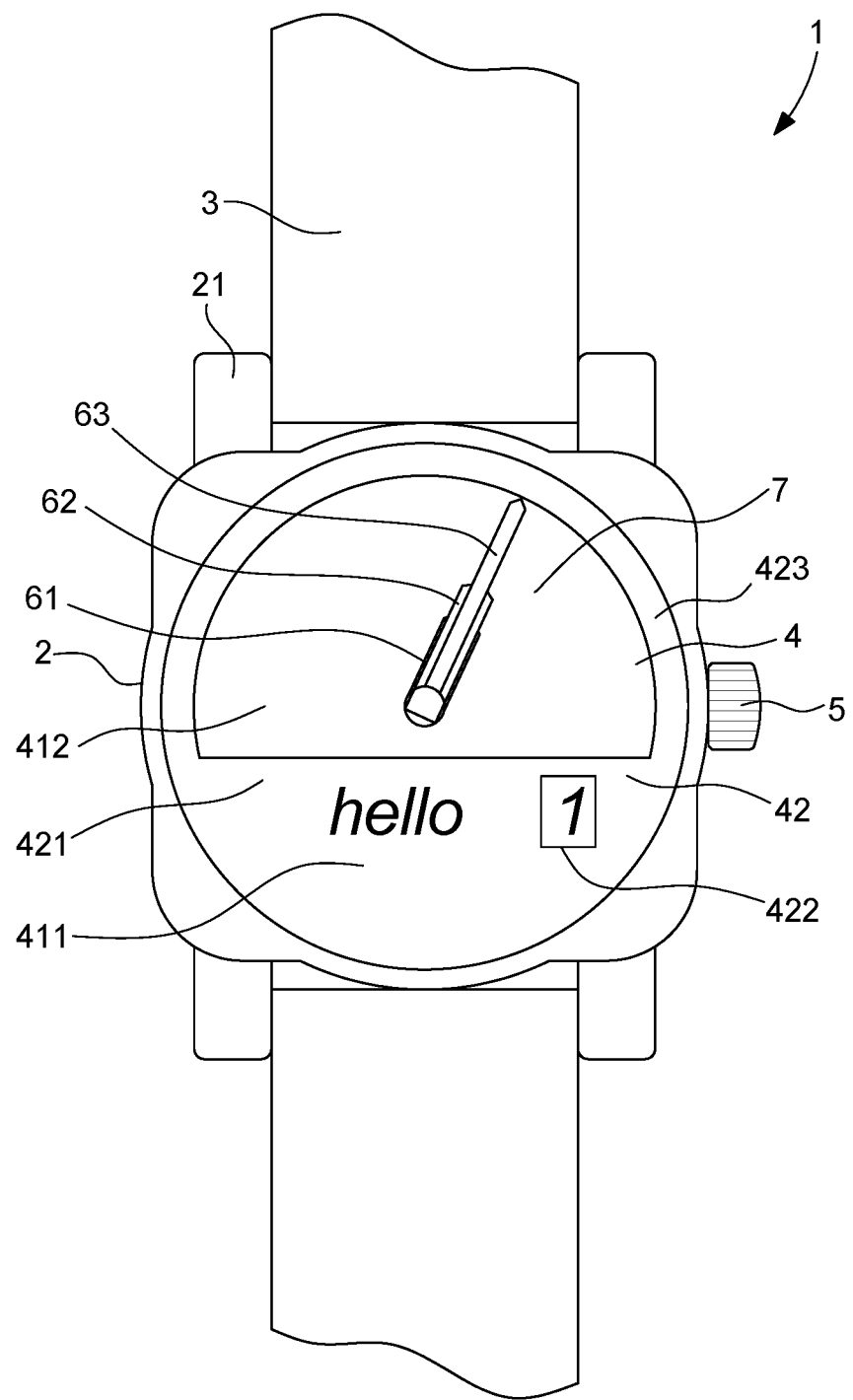
FIGS. 7 to 9 are top views of another alternative of the watch with various display modes.

FIG. 7 illustrates an alternative of a watch 1 according to the invention. In this example, the screen 42 includes a peripheral part 423, which surrounds the second part 412 as well as the main display zone 421. This peripheral part 423 can also belong to the first part 411, the hands 61 to 63 being able to be superimposed therein. The peripheral part 423 can be controlled by the control circuit to allow the display of dynamic indexes, different according to the first or the second operating mode. The screen 42 can be implemented in the form of a matrix display.

Figure 8:
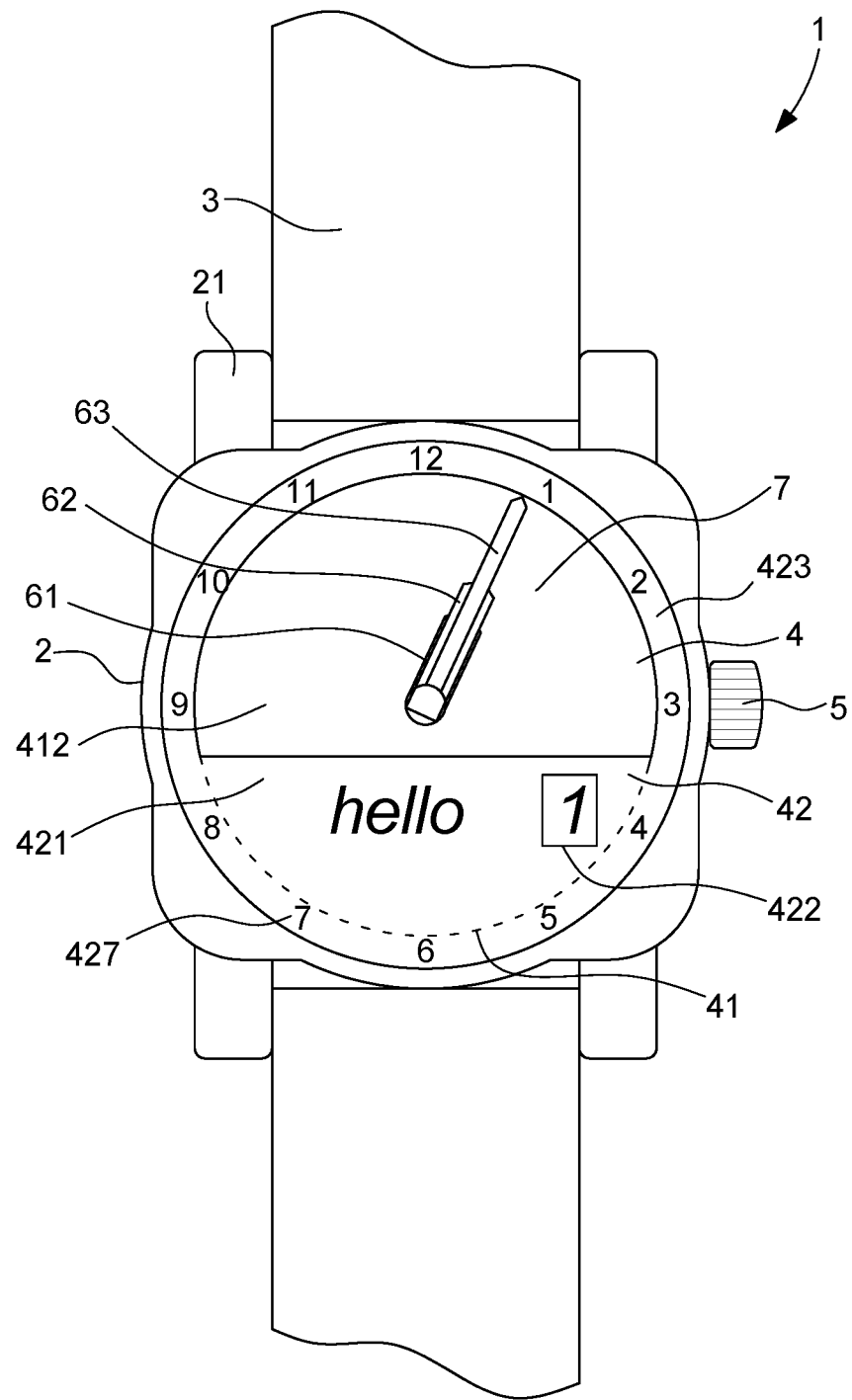

In the example of FIG. 8, the watch 1 is in its first operating mode. The peripheral part 423 thus displays indexes 427 surrounding the sweeping surface 41 of the hands 61 to 63. The indexes 427 displayed here favour the reading of the time in this first operating mode, since they are displayed while replacing and not while being juxtaposed with indexes of the second operating mode.

Figure 9:
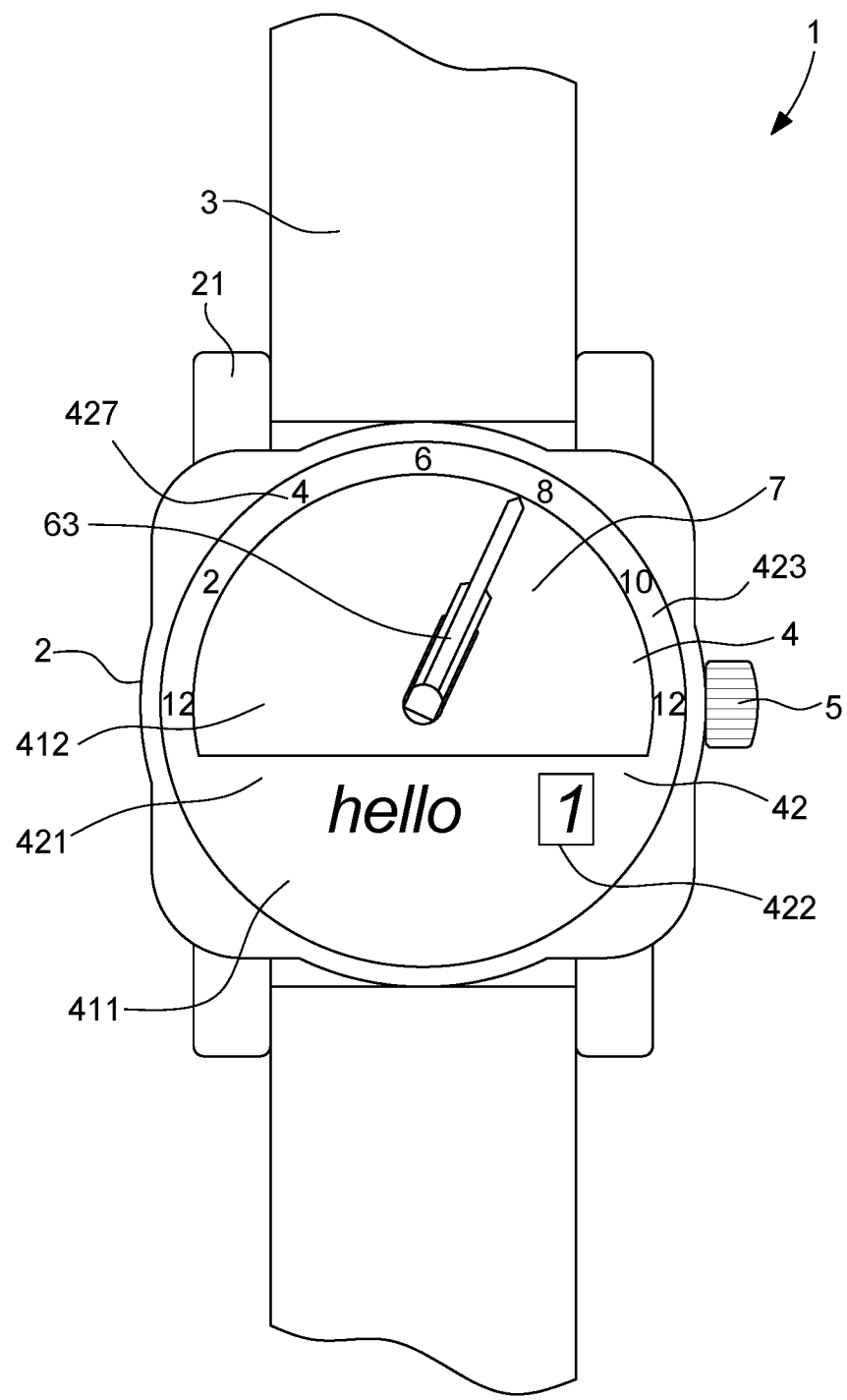

In the example of FIG. 9, the watch 1 is in its second operating mode. The peripheral part 423 thus displays indexes 427 surrounding only the part 412. The indexes 427 displayed here favour the reading of the time in this second operating mode since they are displayed while replacing and not while being juxtaposed with indexes of the first operating mode. Moreover, the indexes 427 correspond precisely to the mode of reading the piece of chronometric information of the second operating mode.

It is also possible for the first and second parts 411 and 412 to form half-discs, so that the display in the second operating mode can be considered to be a half-moon display. The invention can of course apply to types of timepieces other than a watch as illustrated.

The invention claimed is:

1. A timepiece, comprising:
   a case wherein a housing volume is made;
   display hands pivotably mounted in the housing volume;
   a movement, configured to drive the display hands in rotation, one complete rotation of the display hands defining a sweeping surface;
   a display screen positioned in the housing volume below the level of the display hands, a first part of the sweeping surface being superimposed on said display screen and a second part of the sweeping surface not being superimposed on said display screen;
   a control circuit configured to sequentially switch between first and second operating modes, with:
   a first operating mode wherein the control circuit controls the driving of the display hands in the first and second parts of the sweeping surface in order to display a piece of chronometric information;
   a second operating mode wherein the control circuit controls the driving of the display hands only in the second part of the sweeping surface in order to display a piece of chronometric information and wherein the control circuit controls the display of a piece of information by the display screen.

2. The timepiece according to claim 1, further comprising a switch capable of being used from outside the case and associated with the control circuit so as to trigger a switching between the first and second operating modes.

3. The timepiece according to claim 1, wherein the control circuit is configured to automatically switch from the first to the second operating mode as soon as it controls a display on said display screen.

4. The timepiece according to claim 1, wherein the first and second parts of the sweeping surface are half-discs.

5. The timepiece according to claim 1, wherein the control circuit superimposes the display hands and drives them in rotation so as to display a piece of chronometric information in said second operating mode.

6. The timepiece according to claim 1, wherein the piece of chronometric information displayed is of the hour, countdown or chronograph type.

7. The timepiece according to claim 1, wherein a dial separates the display hands from the control circuit, the dial being provided with an index for displaying time.

8. The timepiece according to claim 1, wherein the dial includes a first series of indexes and a second series of indexes corresponding to respective chronometric information for the first and second operating modes.

9. The timepiece according to claim 1, wherein the screen includes a peripheral part surrounding the sweeping surface, the control circuit being configured to display different indexes on the peripheral part according to the first or the second operating mode.

* * * * *